(12) United States Patent
Hsu

(10) Patent No.: US 7,066,080 B2
(45) Date of Patent: Jun. 27, 2006

(54) AUTOMATIC DRIP COFFEE MAKER

(75) Inventor: Tony Hsu, Yung Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 201 days.

(21) Appl. No.: 10/714,975

(22) Filed: Nov. 18, 2003

(65) Prior Publication Data

US 2005/0103201 A1    May 19, 2005

(51) Int. Cl.
*A47J 31/04* (2006.01)

(52) U.S. Cl. .......................... 99/307; 99/281; 99/288; 99/306

(58) Field of Classification Search ................ 99/307, 99/306, 304, 281, 280, 282, 283, 279, 288
See application file for complete search history.

(56) References Cited

U.S. PATENT DOCUMENTS

| 4,360,128 | A | * | 11/1982 | Neumann ..................... 222/26 |
| 4,772,777 | A | * | 9/1988 | Weller et al. ................ 392/467 |
| 4,825,758 | A | * | 5/1989 | Snowball et al. ............. 99/282 |
| 4,995,311 | A | * | 2/1991 | Naya et al. ................... 99/295 |
| 5,283,854 | A | * | 2/1994 | Schiebelhuth ............... 392/467 |
| 6,722,264 | B1 | * | 4/2004 | Takatsuki et al. ............. 99/288 |

* cited by examiner

*Primary Examiner*—Reginald L. Alexander
(74) *Attorney, Agent, or Firm*—Rosenberg, Klein & Lee

(57) ABSTRACT

An automatic drip coffee maker includes a reservoir, a basket, and a chamber disposed at where below an opening of the basket. A thermostat and a heating tube are provided at the bottom of the chamber. A bowl is placed into the chamber to receive coffee drips delivered through the opening of the basket. The coffee in the bowl is continuously kept hot due to the thermostat and the heating tube without being contaminated. A control device is provided in the bowl to control the delivery of the coffee through an outlet to be poured into any type of coffee cup.

1 Claim, 6 Drawing Sheets

AUTOMATIC DRIP COFFEE MAKER

BACKGROUND OF THE INVENTION (a) Field of the Invention

The present invention is related to an automatic drip coffee maker, and more particularly, to one provided with a bowl in a chamber to contain coffee, and a thermostat and a heating tube to continuously keep the coffee hot for preventing pollution, and easy access for a drink with various types of container.

(b) Description of the Prior Art

Whereas there is the great population of coffee-drinker, a coffee maker is very popular. As illustrated in FIG. 6 of the accompanying drawings, an automatic drip coffee maker A contains a reservoir A1, a heater A2 to heat the water in the reservoir A1, a basket A3 containing ground coffee beans, a pipe A4 for the hot water to enter into the basket A3, a valve A5 disposed at the bottom of the basket A3, and a dedicated coffee pot A6 placed below the basket A3 and holding with its top against and open up the valve A5, coffee drips automatically drop into the coffee pot A6, and a warming plate disposed at the bottom of the coffee pot A to keep coffee in the coffee pot A6 hot.

To fetch for a cup of coffee, the coffee pot A6 must be removed away from where below the valve A5 of the basket A3 to pour the coffee into a cup. However, the prior art of the coffee maker is found with several shortcomings including that any container other than the dedicated coffee pot A6 is not necessarily able to hold against and open up the valve A5; that the coffee is vulnerable to be contaminated due to that coffee pot A6 is exposed out of the coffee maker A without any screening structure; and that the coffee gets cool easily due to the insufficient warming results of the warming panel.

SUMMARY OF THE INVENTION

The primary purpose of the present invention is to provide a coffee maker that does not require a dedicated coffee pot, allows easy access for having a cup of coffee, prevents coffee from being contaminated, and assures of a sufficient warming effect for the coffee. To achieve the purpose, a chamber inserted with a bowl is disposed at where below an opening of the basket, and a thermostat and a heating tube are provided at the bottom of the chamber, an outlet is disposed at the bottom of the bowl adapted with a control device.

Accordingly, the present invention has the following advantages:
1. Any type of coffee cup can be used to fetch for the coffee, since there is no need for the dedicated coffee pot to permit an easy and convenient access to the coffee.
2. A thermostat and a heating pipe are provided at the bottom of the chamber to ensure of keeping the coffee hot in the bowl.
3. A mobile door is provided to the outer side of the chamber to prevent the coffee from being contaminated.

DETAILED DESCRIPTION OF THE PREFERRED EMBODIMENTS

Figure 1:
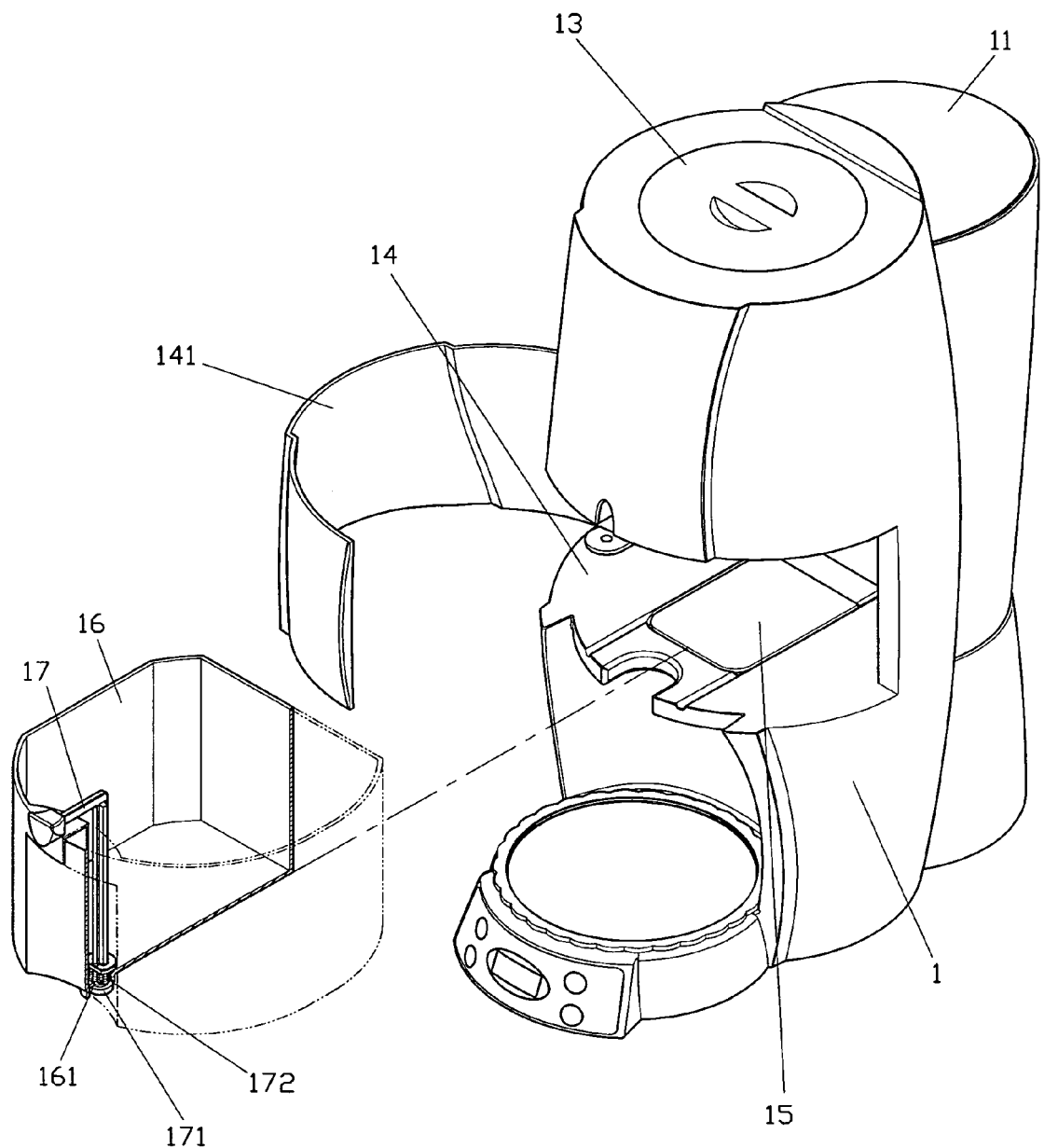
FIG. 1 is an exploded view of a preferred embodiment of the present invention.
Figure 2:
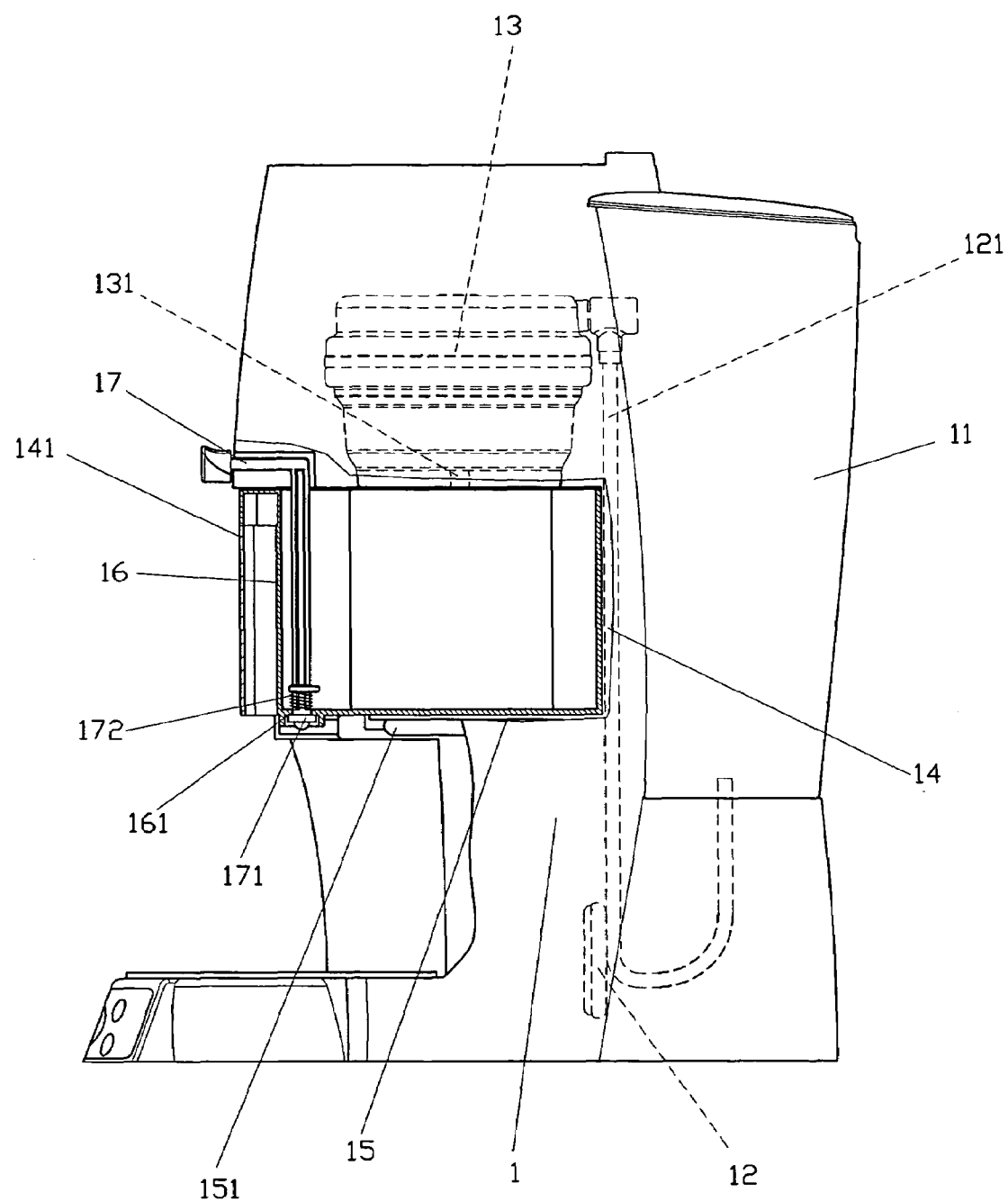
FIG. 2 is a cross-sectional view of an assembly of the preferred embodiment of the present invention.

As illustrated in FIGS. 1 and 2, an automatic drip coffee maker 1 of the present invention essentially comprises a reservoir 11, a basket 13, and a chamber 14. The reservoir 11 is disposed on the back of the coffee maker 1. A heater 12 is provided to heat up the water in the reservoir 11. The hot water enters into the basket 13 through a delivery pipe 121. Ground coffee beans are placed in the basket 13 and an opening 131 is disposed at the bottom of the basket 13. The chamber 14 is provided at where below the opening 131. A mobile door 141 is provided to the outer side of the chamber 14. A thermostat 15 and a heating pipe 151 are disposed at the bottom of the chamber 14. A bowl 16 is placed in the chamber 14 and an outlet 161 is disposed at the bottom of the bowl 16. The outlet 161 is subject to the control by a control device 17. The control device 17 is made in a rod shape with a valve block 171 disposed at the bottom of the control device 17. A spring 172 is inserted onto the valve block 171, and the spring 172 is compressed by the control device 17 to move the valve block 171, thus to open up the outlet 161.

Figure 3:
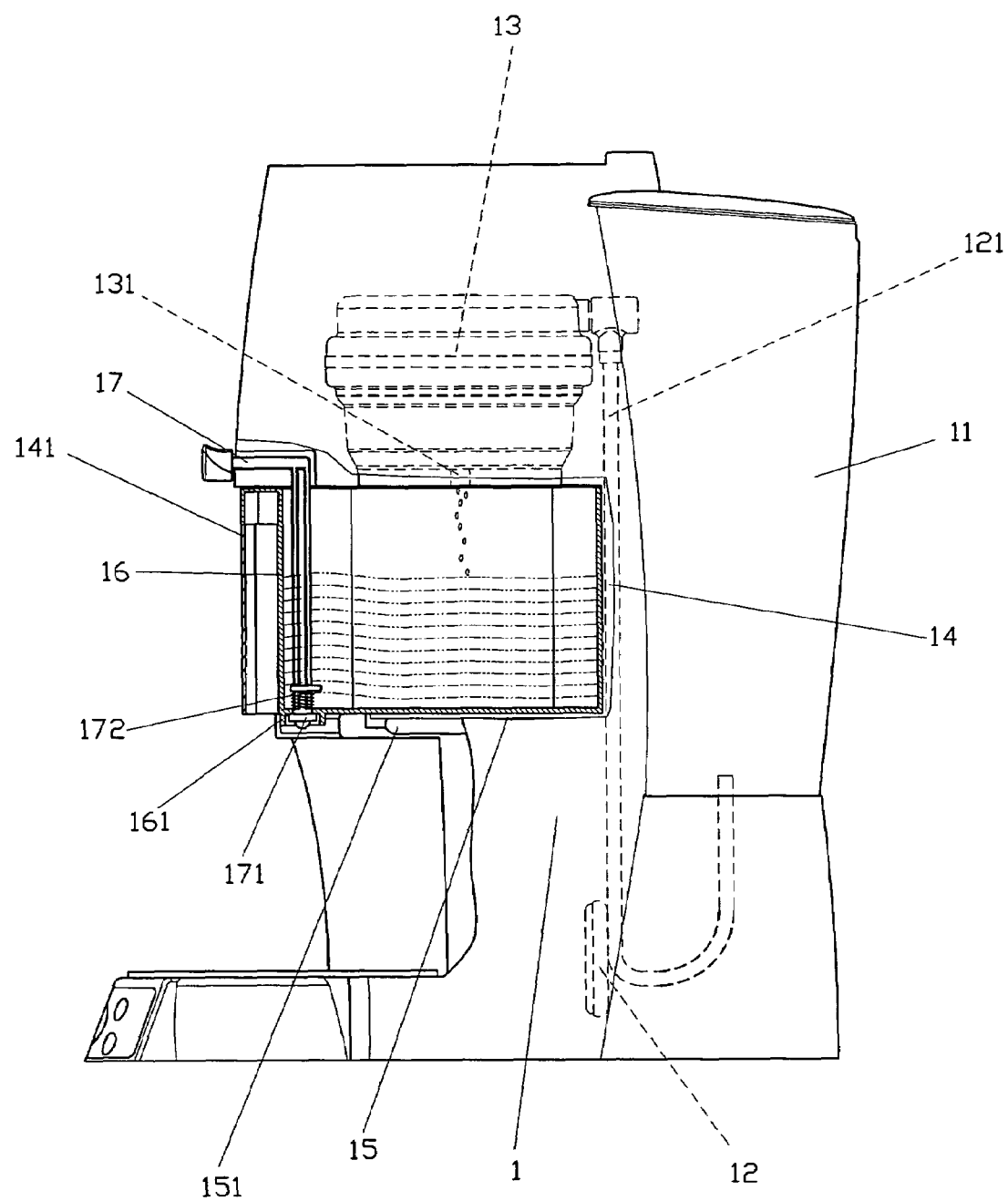
FIG. 3 is a cross-sectional view showing coffee drips falling into a bowl of the preferred embodiment of the present invention.
Figure 4:
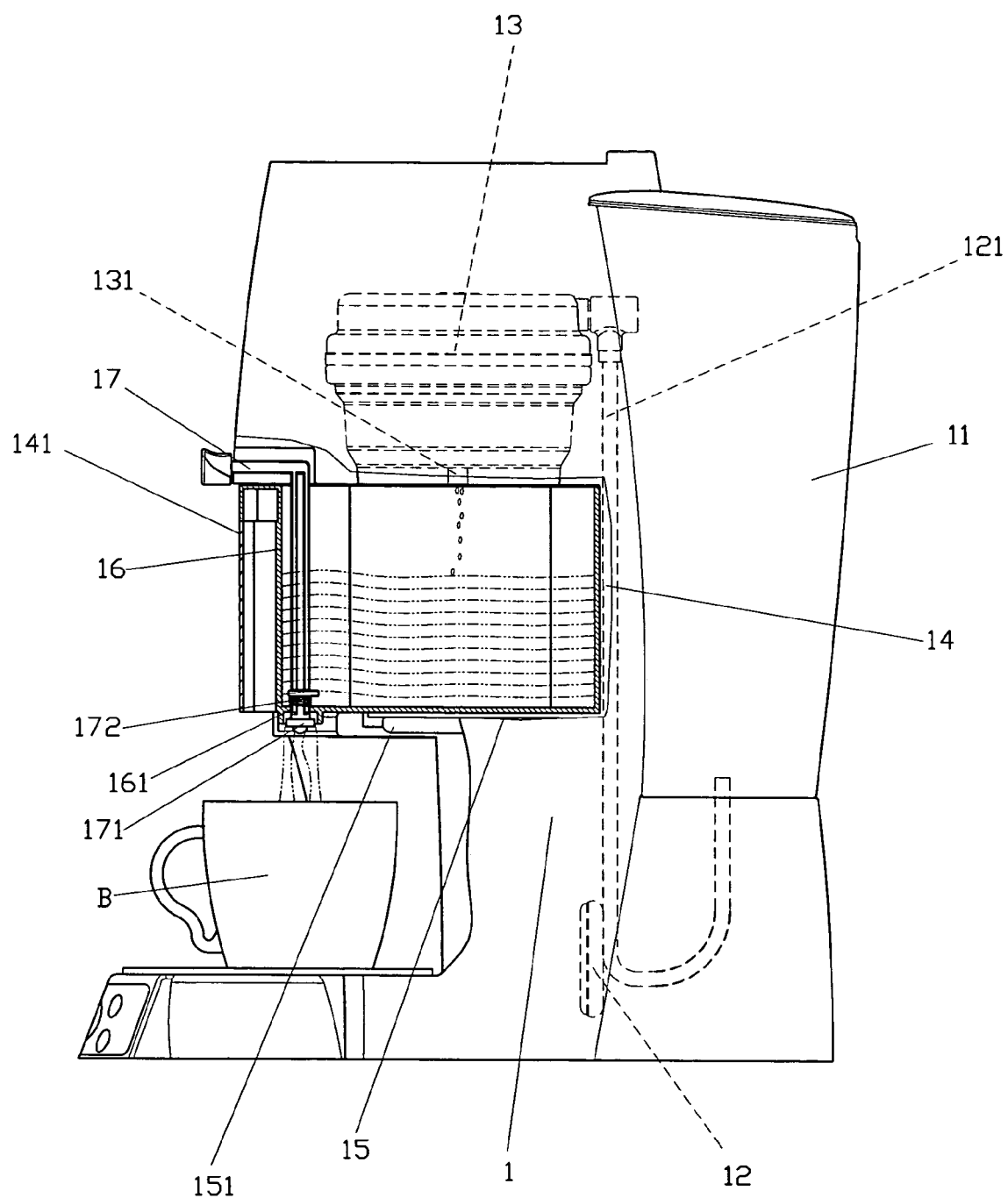
FIG. 4 is a cross-sectional view showing how a control device opens up an outlet of the preferred embodiment of the present invention.
Figure 5:
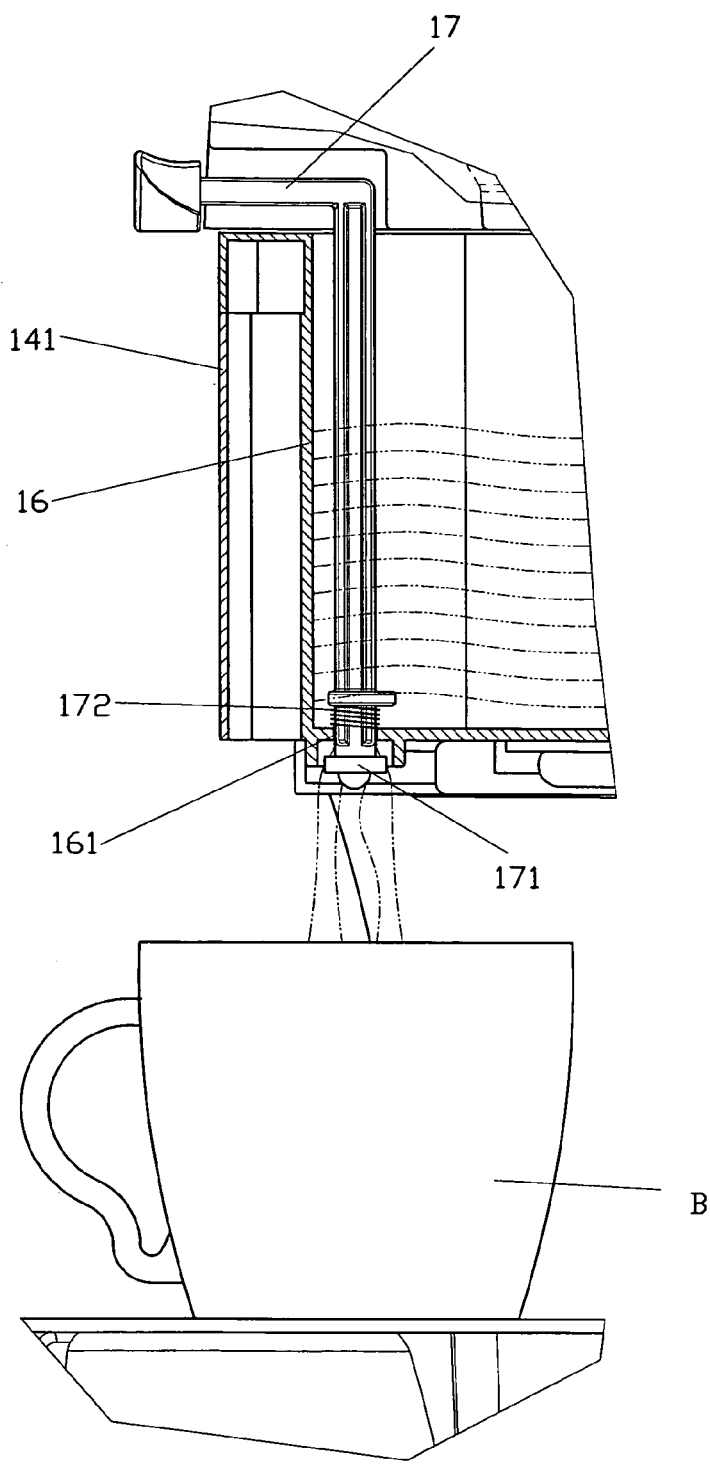
FIG. 5 is a cross-sectional view showing how coffee flows out of the outlet.
Figure 6:
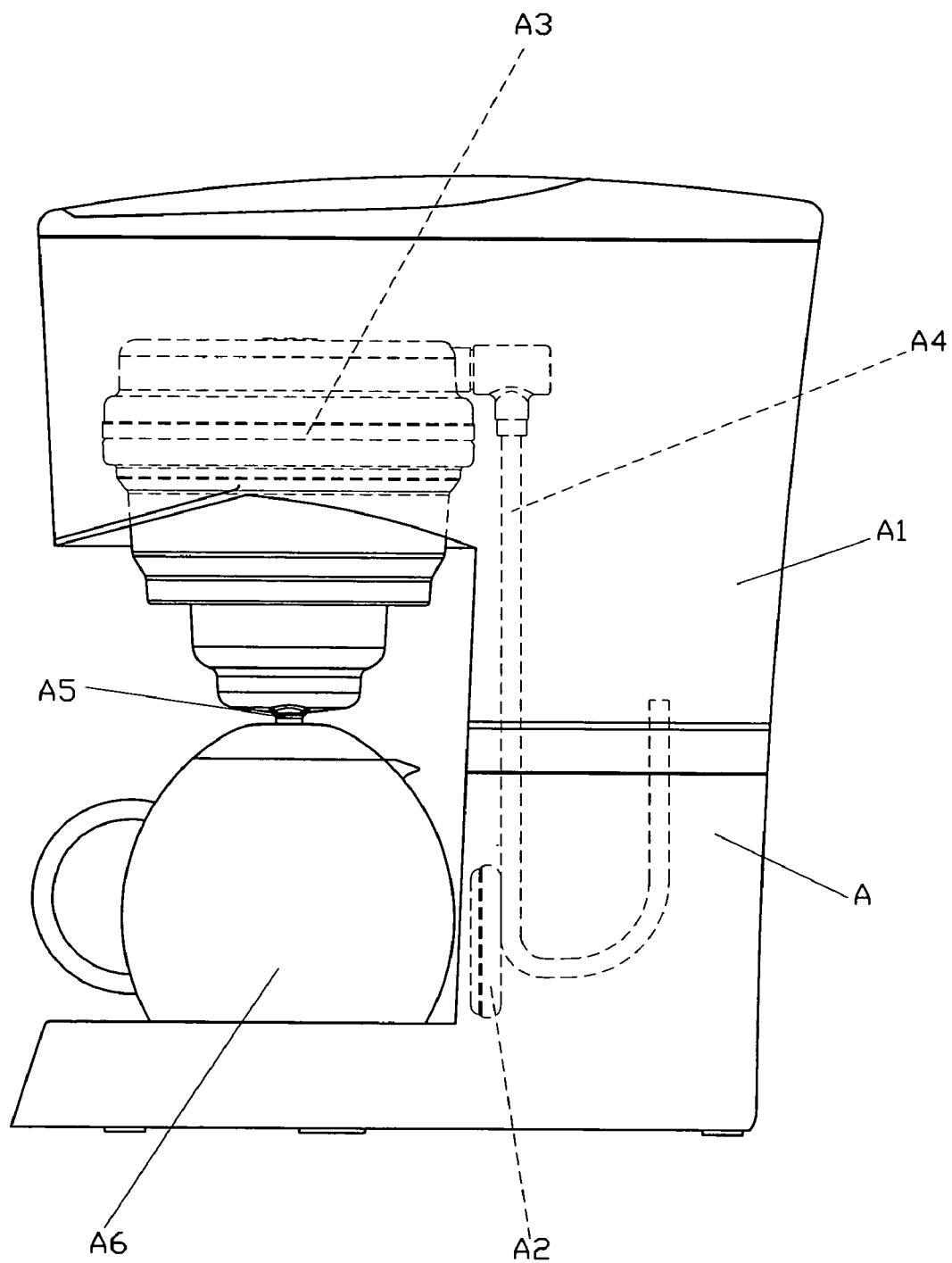
FIG. 6 is a side view showing a prior art.

To make coffee, as illustrated in FIG. 3, fill up the reservoir 11 with water, place the proper amount of ground coffee beans into the basket 13, place the bowl 16 into the chamber 14, the outlet 161 is plugged by the valve block 171 of the control device 17 with the elasticity exercised by the spring 172, thus to close up the mobile door 141. Water in the reservoir 11 is heated up by the heater 12 and the hot water is then guided through the delivery pipe 121 into the basket 13 to filter through the ground coffee beans contained in the basket 13 for the coffee drips to fall into the bowl 16 in the chamber 14 through the opening 131. The coffee in the bowl 16 is kept hot by means of the thermostat 15 and the heating pipe 151. To fetch for a cup of coffee as illustrated in FIG. 4, just place any coffee cup B under the outlet 161 and press the control device 17 for the spring 172 to move the valve block 171 away from the outlet 161 for delivering the coffee into the coffee cup B as illustrated in FIG. 5

I claim:

1. An automatic drip coffee maker comprising:
a reservoir for holding water;
a basket adapted to contain ground coffee beans, the basket having an opening disposed at a bottom thereof;
a heater for heating water from the reservoir and supplying the heated water to the basket;
a chamber being disposed below the opening and having a displaceable door to provide access thereto;
a bowl removably disposed in the chamber below the opening at the bottom of the basket to receive coffee therefrom the bowl having an outlet disposed at a bottom of the bowl;
a thermostat disposed in the chamber beneath the bowl;
a heating tube disposed in the chamber beneath the bowl to maintain a temperature of coffee therein;

a control device operatively disposed in the bowl to open and close the outlet of the bowl for controlling a flow of coffee from the outlet, the control device having a bifurcated body formed by a pair of parallel rod-shaped elements extending to the outlet of the bowl and being displaceable thereinto, the pair of rod-shaped elements having a valve block coupled to distal ends thereof and disposed external to the bowl, the control device being biased by a spring to close the outlet with the valve block, the control device being displaceable against the spring bias to open the outlet by displacing the valve block therefrom.

* * * * *